(12) United States Patent
Yang et al.

(10) Patent No.: US 11,874,497 B2
(45) Date of Patent: Jan. 16, 2024

(54) PHOTONIC CHIP AND PREPARATION METHOD THEREOF

(71) Applicant: INSTITUTE OF SEMICONDUCTORS, CHINESE ACADEMY OF SCIENCES, Beijing (CN)

(72) Inventors: Lin Yang, Beijing (CN); Shanglin Yang, Beijing (CN); Lei Zhang, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 36 days.

(21) Appl. No.: 17/627,544

(22) PCT Filed: Jul. 17, 2019

(86) PCT No.: PCT/CN2019/096361
§ 371 (c)(1),
(2) Date: Jan. 14, 2022

(87) PCT Pub. No.: WO2021/007806
PCT Pub. Date: Jan. 21, 2021

(65) Prior Publication Data
US 2022/0260779 A1 Aug. 18, 2022

(51) Int. Cl.
*G02B 6/12* (2006.01)

(52) U.S. Cl.
CPC .. *G02B 6/12011* (2013.01); *G02B 2006/1204* (2013.01); *G02B 2006/12061* (2013.01); *G02B 2006/12164* (2013.01)

(58) Field of Classification Search
CPC ........ G02B 6/12011; G02B 2006/1204; G02B 2006/12061; G02B 2006/12164;
(Continued)

(56) References Cited

U.S. PATENT DOCUMENTS 7,257,283 B1  8/2007  Liu et al.
8,824,836 B2  9/2014  Sugiyama
(Continued)

FOREIGN PATENT DOCUMENTS

CN  101604074 A  12/2009
CN  102164017 A  8/2011
(Continued)

OTHER PUBLICATIONS

International Search Report and Written Opinion for International Patent Application No. PCT/CN2019/096361, dated Jul. 17, 2019, 14 pages. Only Search Report in English.
(Continued)

*Primary Examiner* — Eric Wong
(74) *Attorney, Agent, or Firm* — Christopher R. Christenson; Kelly, Holt & Christenson, P.L.L.C.

(57) ABSTRACT

A photonic chip and a preparation method thereof are provided. The chip includes a lithium niobate film modulator array, a first optical coupling array, and a silica waveguide wavelength-division multiplexer, and the lithium niobate film modulator array includes one or more lithium niobate film modulators and is used to modulate an optical signal; the first optical coupling array includes one or more first optical coupling structures, and the first optical coupling structure has one end connected to a corresponding lithium niobate thin film modulator and the other end connected to the silica waveguide wavelength-division multiplexer so as to transmit the modulated optical signal to the silica waveguide wavelength-division multiplexer; and the silica waveguide wavelength-division multiplexer is used to perform wavelength-division multiplexing on the modulated optical signal.

9 Claims, 14 Drawing Sheets

(58) Field of Classification Search
CPC ........ G02B 6/1228; G02B 2006/12142; G02F 1/035; G02F 1/212
See application file for complete search history.

(56) References Cited

U.S. PATENT DOCUMENTS

| | | | |
|---|---|---|---|
| 9,372,306 B1 | 6/2016 | Nagarajan et al. | |
| 2003/0095737 A1* | 5/2003 | Welch | H01S 5/0683 385/14 |
| 2005/0276613 A1 | 12/2005 | Welch et al. | |
| 2009/0103850 A1 | 4/2009 | Shastri et al. | |
| 2009/0324163 A1 | 12/2009 | Dougherty et al. | |
| 2011/0096925 A1 | 4/2011 | Zbu et al. | |
| 2014/0079351 A1* | 3/2014 | Macario | C25D 7/00 205/159 |
| 2015/0277207 A1* | 10/2015 | Fujikata | G02F 1/0121 385/3 |
| 2016/0109731 A1* | 4/2016 | Huang | G02B 6/12002 385/2 |
| 2016/0149662 A1* | 5/2016 | Soldano | G02B 6/4215 385/14 |
| 2017/0168252 A1* | 6/2017 | Pezeshki | H04B 10/40 |
| 2019/0140415 A1 | 5/2019 | Sun et al. | |

FOREIGN PATENT DOCUMENTS

| | | | |
|---|---|---|---|
| CN | 104330940 A | 2/2015 | |
| CN | 105044931 A | 11/2015 | |
| CN | 105068189 A | 11/2015 | |
| CN | 206133134 U | 4/2017 | |
| CN | 106933001 A | 7/2017 | |
| CN | 108732795 A | 11/2018 | |
| CN | 109407208 A | 3/2019 | |
| CN | 109639359 A | 4/2019 | |
| CN | 110012368 A | 7/2019 | |
| DE | 10201103 A1 * | 7/2003 | ......... G02B 6/12004 |
| JP | 2002116419 A | 4/2002 | |
| JP | 2010512543 A | 4/2010 | |

OTHER PUBLICATIONS

Office Action for China Patent Application No. 201910648713.1, dated Jan. 14, 2020, 13 pages.
Extended European Search Report for European Patent Application No. 19938090.8 dated Mar. 1, 2023, 9 pages.
Final Office Action for Japanese Patent Application No. 2022-503400, dated Feb. 7, 2023, 7 pages.
Yamazaki et al. "Advanced Optical Modulators With Hybrid Configuration Of Silica-Based PLC and LiNbO3 Phase-Shifter Array For Ultra-High-Speed Transport Networks", Japan Patent Office downloaded on Jan. 26, 2023, 9 pages.
He et al. "High-Performance Hybrid Silicon And Lithium Niobate Mach-Zehnder Modulators for 100 Gbit/s and Beyond", 2022, 21 pages.

* cited by examiner

PHOTONIC CHIP AND PREPARATION METHOD THEREOF

CROSS REFERENCE TO RELATED APPLICATION(S)

This application is a Section 371 National Stage Application of International Application No. PCT/CN2019/096361, filed on Jul. 17, 2019, entitled "PHOTONIC CHIP AND PREPARATION METHOD THEREOF", the contents of which is incorporated herein by reference in its entirety.

TECHNICAL FIELD

The present disclosure relates to the field of optical fiber communication and integrated optics technologies, and in particular to a photonic chip and a preparation method thereof.

BACKGROUND

In an existing optical fiber communication technology, discrete device structures such as a modulator and a wavelength-division multiplexer are used to modulate and multiplex an optical signal, which have disadvantages of a large volume, a high insertion loss, etc. With an emergence of a lithium niobate thin film processing technology platform and a heterogeneous integration, it is possible to integrate a lithium niobate modulation structure and a wavelength-division multiplexing structure on a single chip. In a related art, the lithium niobate modulation structure and the wavelength-division multiplexing structure have not been integrated reliably.

SUMMARY

The present disclosure provides a photonic chip including a lithium niobate thin film modulator array, a first optical coupling array, and a silica waveguide wavelength-division multiplexer, wherein the lithium niobate thin film modulator array includes one or more lithium niobate thin film modulators and is configured to modulate an optical signal; the first optical coupling array includes one or more first optical coupling structures, and the first optical coupling structure has one end connected to a corresponding lithium niobate thin film modulator and the other end connected to the silica waveguide wavelength-division multiplexer so as to transmit the modulated optical signal to the silica waveguide wavelength-division multiplexer; and the silica waveguide wavelength-division multiplexer is configured to perform wavelength-division multiplexing on the modulated optical signal.

Optionally, the lithium niobate thin film modulator includes: a first substrate; a first buried silica layer arranged on the first substrate; a first lithium niobate thin film waveguide arranged on the first buried silica layer according to a first preset shape; a metal electrode arranged on both sides of the first lithium niobate thin film waveguide layer; a first cladding silica layer covering the first buried silica layer, the first lithium niobate thin film waveguide and the metal electrode, wherein the first cladding silica layer is provided with a through hole to expose the metal electrode; a terminal resistor connected to the metal electrode through the through hole; a metal lead wire connected to the metal electrode through the through hole; and a first top silica layer covering the first cladding silica layer and the terminal resistor.

Optionally, the first optical coupling structure includes: a second substrate; a second buried silica layer arranged on the second substrate; a second lithium niobate thin film waveguide arranged on the second buried silica layer, wherein the second lithium niobate thin film waveguide is shaped as a tapered structure having an end with a larger cross-sectional area connected to the first lithium niobate thin film waveguide and an end with a smaller cross-sectional area connected to the silica waveguide wavelength-division multiplexer; a second cladding silica layer covering the second buried silica layer and the second lithium niobate thin film waveguide; and a second top silica layer covering the second cladding silica layer.

Optionally, the silica waveguide wavelength-division multiplexer includes: a third substrate; a third buried silica layer arranged on the third substrate; a silica waveguide arranged on the third buried silica layer according to a second preset shape, and connected to the end with the smaller cross-sectional area of the second lithium niobate thin film waveguide; and a third top silica layer covering the silica waveguide.

Optionally, the first buried silica layer, the second buried silica layer or the third buried silica layer is a single silica-layer with a refractive index greater than that of the first substrate, the second substrate or the third substrate; or the first buried silica layer, the second buried silica layer or the third buried silica layer is a double silica-layer with a refractive index less than that of the first substrate, the second substrate or the third substrate, and a lower silica-layer in the double silica-layer has a refractive index less than that of an upper silica-layer in the double silica-layer.

Optionally, a difference between a refractive index of the first cladding silica layer, the second cladding silica layer or the silica waveguide and a refractive index of the first buried silica layer, the second buried silica layer or the third buried silica layer is less than a first preset value.

Optionally, a difference between a refractive index of the first top silica layer, the second top silica layer and the third top silica layer and a refractive index of the first substrate, the second substrate and the third substrate is less than a second preset value.

Optionally, a difference between a refractive index of the first buried silica layer, the second buried silica layer or the third buried silica layer and a refractive index of the first substrate, the second substrate and the third substrate is greater than a third preset value, and a difference between a refractive index of the first cladding silica layer, the second cladding silica layer or the silica waveguide and a refractive index of the first top silica layer, the second top silica layer and the third top silica layer is greater than the third preset value.

The present disclosure further provides a method of preparing a photonic chip, including: S1 of preparing a substrate including a first substrate, a second substrate and a third substrate; S2 of preparing a buried silica layer on the substrate, wherein the buried silica layer includes a first buried silica layer, a second buried silica layer and a third buried silica layer; S3 of preparing a first lithium niobate thin film waveguide on the first buried silica layer, and preparing a tapered second lithium niobate thin film waveguide on the second buried silica layer; S4 of preparing a metal electrode on both sides of the first lithium niobate thin film waveguide; S5 of preparing a first cladding silica layer on the first buried silica layer, the first lithium niobate thin film waveguide and the metal electrode, preparing a second cladding silica layer on the second lithium niobate thin film waveguide, and preparing a silica waveguide on the third buried silica layer; S6 of preparing a terminal resistor and a metal lead wire on the first cladding silica layer, and connecting the terminal resistor and the metal lead wire to the metal electrode through a through hole in the first cladding silica layer; S7 of preparing a first top silica layer on the first cladding silica layer and the terminal resistor, preparing a second top silica layer on the second cladding silica layer, and preparing a third top silica layer on the silica waveguide.

Optionally, the second lithium niobate thin film waveguide has an end with a larger cross-sectional area connected to the first lithium niobate thin film waveguide and an end with a smaller cross-sectional area connected to the silica waveguide.

DETAILED DESCRIPTION OF EMBODIMENTS

In order to make the objective, technical solution and advantages of the present disclosure clearer, the present disclosure will be further described in detail below in connection with specific embodiments and with reference to the drawings.

The present disclosure provides a photonic chip and a preparation method thereof, in which a lithium niobate thin film modulator, a wavelength-division multiplexer, and a first optical coupling structure for the two are integrated on the photonic chip, so that a prepared device has a small volume, a high process precision and a good repeatability, and a high device yield may be achieved.

Figure 1:
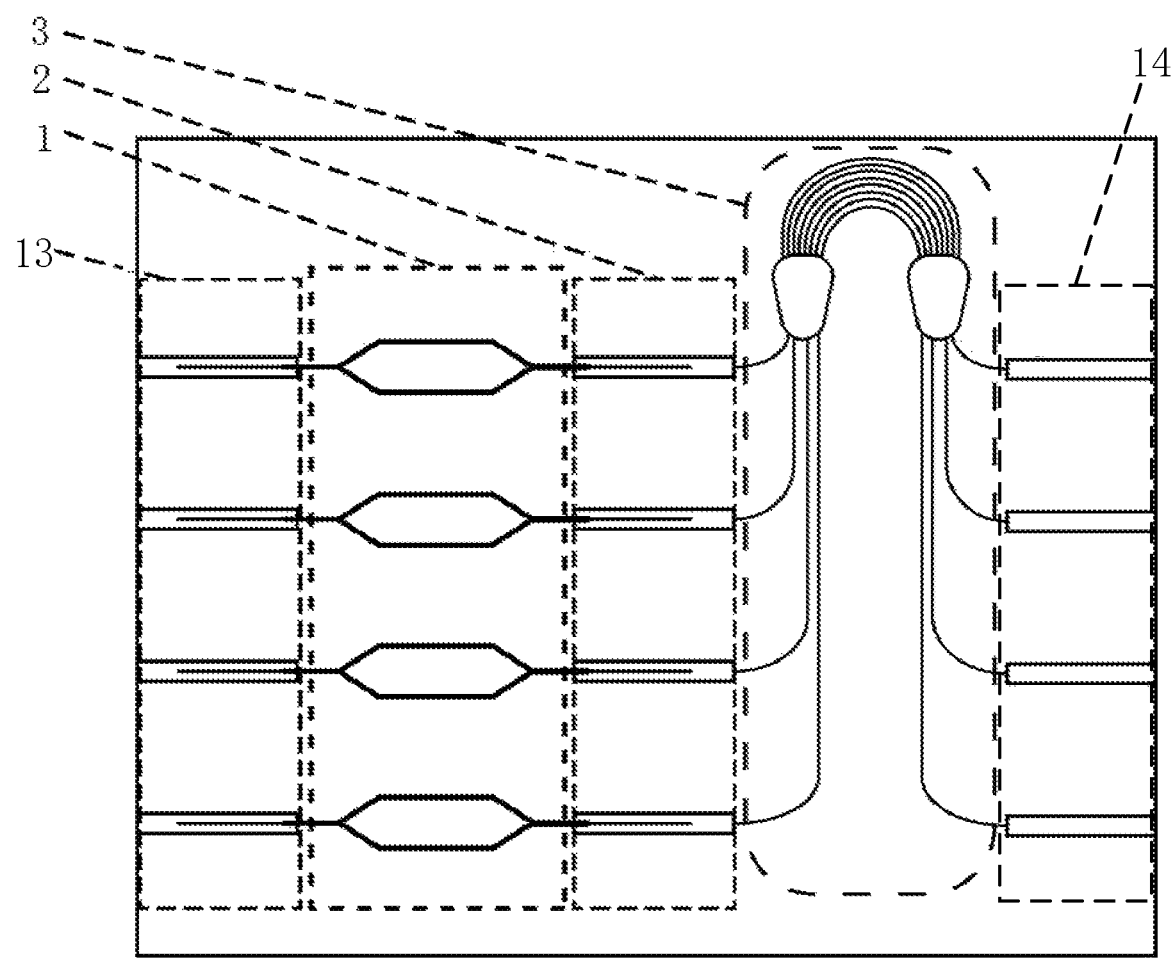
FIG. 1 schematically shows a schematic structural diagram of a photonic chip provided by the embodiments of the present disclosure.

An embodiment of the present disclosure provides a photonic chip. Referring to FIG. 1, a structure shown in FIG. 1 will be described in detail with reference to FIG. 2 to FIG. 13.

The photonic chip in the embodiment of the present disclosure includes a lithium niobate thin film modulator array 1, a first optical coupling array 2, and a silica waveguide wavelength-division multiplexer 3. The lithium niobate thin film modulator array 1 includes one or more lithium niobate thin film modulators and is used to modulate an optical signal. The first optical coupling array 2 includes one or more first optical coupling structures, and the first optical coupling structure has one end connected to a corresponding lithium niobate thin film modulator and the other end connected to the silica waveguide wavelength-division multiplexer 3 so as to transmit the modulated optical signal to the silica waveguide wavelength-division multiplexer 3. The silica waveguide wavelength-division multiplexer 3 is used to perform wavelength-division multiplexing on the modulated optical signal.

The lithium niobate thin film modulator includes the following structures from bottom to top.

A first substrate 4 may be a quartz substrate containing a material composition of, for example, pure silica or doped silica, or other materials.

A first buried silica layer 5 may be arranged on the first substrate 4, and contain a material composition of pure silica or doped silica. The first buried silica layer 5 may be a single silica-layer (shown in FIG. 2A) or a double silica-layer (shown in FIG. 2B). Specifically, in a case that a refractive index of the first buried silica layer 5 is greater than that of the first substrate 4, a single silica-layer may be used. In a case that the refractive index of the first buried silica layer 5 is less than that of the first substrate 4, a double silica-layer may be used, and a lower silica-layer in the double silica-layer has a refractive index less than that of an upper silica-layer in the double silica-layer.

A first lithium niobate thin film waveguide 6 may be a lithium niobate thin film optical waveguide structure arranged on the first buried silica layer 5 according to a first preset shape, and contain a material composition of lithium niobate or doped lithium niobate. The first preset shape may be, for example, a Mach-Zehnder interference type (shown in FIG. 3A and FIG. 3B) or a micro-ring coupler type (shown in FIG. 3C and FIG. 3D), etc. The first lithium niobate thin film waveguide 6 may also be, for example, a single waveguide. The single waveguide may cooperate with the metal electrode to form a phase modulator, which is also a kind of lithium niobate thin film modulator. In the embodiments of the present disclosure, an operating wavelength of the lithium niobate thin film modulator may include, but is not limited to light waves in typical optical communication bands of 1310 nm and 1550 nm. A modulation mode of the lithium niobate thin film modulator may include an intensity modulation and a phase modulation, and may also include a non-coherent modulation and a coherent modulation, but the modulation mode is not limited to this. It may be understood that a structure of the first lithium niobate thin film waveguide 6 in the lithium niobate thin film modulator is not limited to the above example shape, and may also be other structures capable of converting an electrical signal into an optical signal.

A metal electrode 7 may be arranged on both sides near the first lithium niobate thin film waveguide layer 6 (shown in FIG. 5A and FIG. 5B), and contain a material composition of gold, copper or other conductive materials.

Figure 8A:
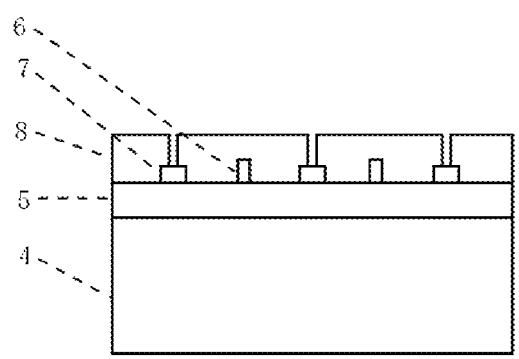
FIG. 8A and FIG. 8B schematically show a front view and a top view of a cross-section of a lithium niobate thin film modulator region after etching in operation S5 provided by the embodiments of the present disclosure, respectively.
Figure 8B:
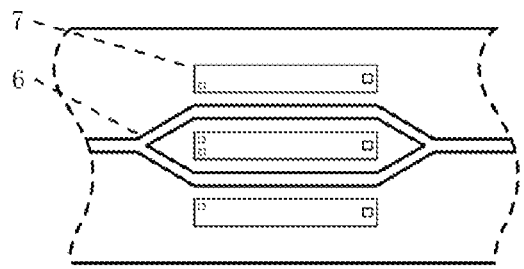

A first cladding silica layer 8 may cover the first buried silica layer 5, the first lithium niobate thin film waveguide 6 and the metal electrode 7, and a through hole is provided in the first cladding silica layer 8 to expose the metal electrode 7 (shown in FIG. 8A and FIG. 8B). The first cladding silica layer 8 contains pure silica or doped silica, and has a refractive index similar to that of the first buried silica layer 5. A difference between the refractive index of the first cladding silica layer 8 and the refractive index of the first buried silica layer 5 is less than a first preset value.

Figure 11A:
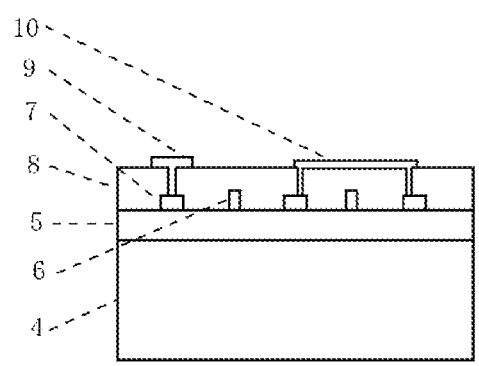
FIG. 11A and FIG. 11B schematically show a front view and a top view of a cross-section of a lithium niobate thin film modulator region after operation S6 is performed provided by the embodiments of the present disclosure, respectively.
Figure 11B:
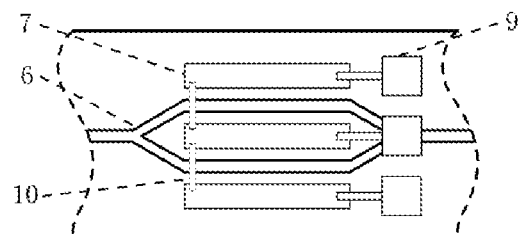

Optionally, a terminal resistor 9 may be connected to the metal electrode 7 through the through hole in the first cladding silica layer 8, so as to achieve a traveling wave electrode impedance matching (shown in FIG. 11A and FIG. 11B). In this case, the terminal resistor 9 is formed on the photonic chip. In addition, the terminal resistor 9 may not be provided on the photonic chip. Instead, for example, the terminal resistor 9 may be mounted on an already packaged photonic chip and connected to the metal electrode 7 of the photonic chip.

A metal lead wire 10 may be connected to the metal electrode 7 through other through hole in the first cladding silica layer 8, so as to provide an electrical signal to the metal electrode (shown in FIG. 11A and FIG. 11B).

Figure 12A:
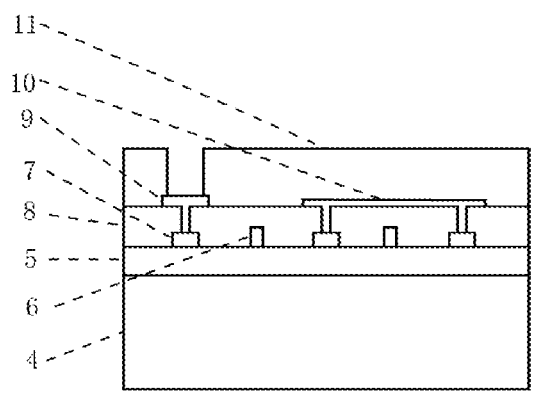
FIG. 12A and FIG. 12B schematically show a front view and a top view of a cross-section of a lithium niobate thin film modulator region after operation S7 is performed provided by the embodiments of the present disclosure, respectively.
Figure 12B:
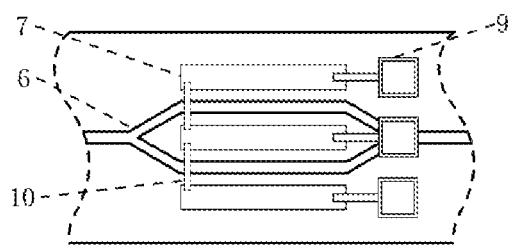

A first top silica layer 11 may cover the first cladding silica layer 8 and the terminal resistor 9, and contain pure silica or doped silica, which has a refractive index similar to that of the first substrate 4 (shown in FIG. 12A and FIG. 12B). A difference between the refractive index of the first top silica layer 11 and the refractive index of the first substrate 4 is less than a second preset value.

Further, a difference between the refractive index of the first buried silica layer 5 and the first cladding silica layer 8 and the refractive index of the first substrate 4 and the first top silica layer 11 is greater than a third preset value, so as to ensure that the refractive index of the first buried silica layer 5 and the first cladding silica layer 8 is not close to the refractive index of the first substrate 4 and the first top silica layer 11.

The first optical coupling structure includes a second substrate 4', a second buried silica layer 5', a second lithium niobate thin film waveguide 6', a second cladding silica layer 8' and a second top silica layer 11' from bottom to top.

The second substrate 4' may be a quartz substrate containing a material composition of pure silica or doped silica or other materials.

The second buried silica layer 5' may be arranged on the second substrate 4', and contain a material composition of pure silica or doped silica. The second buried silica layer 5' may be a single silica-layer (shown in FIG. 2A) or a double silica-layer (shown in FIG. 2B). Specifically, in a case that a refractive index of the second buried silica layer 5' is greater than that of the second substrate 4', a single silica-layer may be used. In a case that the refractive index of the second buried silica layer 5' is less than that of the second substrate 4', a double silica-layer may be used, and a lower silica-layer in the double silica-layer has a refractive index less than that of an upper silica-layer in the double silica-layer.

The second lithium niobate thin film waveguide 6' may be arranged on the second buried silica layer 5', and shaped as a tapered structure having an end with a larger cross-sectional area connected to the lithium niobate thin film modulator, specifically to the first lithium niobate thin film waveguide 6, and an end with a smaller cross-sectional area connected to the silica waveguide wavelength-division multiplexer, specifically extending into the silica waveguide 12. The second lithium niobate thin film waveguide 6' may contain a material composition of lithium niobate or doped lithium niobate.

The second cladding silica layer 8' may cover the second buried silica layer 5' and the second lithium niobate thin film waveguide 6' (shown in FIG. 7A and FIG. 7B), contain a material composition of pure silica or doped silica, and have a refractive index close to that of the second buried silica layer 5'. The second cladding silica layer 8' and the second buried silica layer 5' together form a silica waveguide core layer that encloses the second lithium niobate thin film waveguide 6'.

The second top silica layer 11' may cover the second cladding silica layer 8', contain a composition of pure silica or doped silica, and have a refractive index close to that of the second substrate 4'. The second top silica layer 11' and the second substrate 4' may respectively serve as upper and lower cladding layers for the silica waveguide core layer, and both of the upper and lower cladding layers have a refractive index less than that of the silica waveguide core layer.

Furthermore, a difference between the refractive index of the second buried silica layer 5' and the second cladding silica layer 8' and the refractive index of the second substrate 4' and the second top silica layer 11' is greater than the third preset value.

The silica waveguide wavelength-division multiplexer 3 includes a third substrate 4", a third buried silica layer 5", a silica waveguide 12 and a third top silica layer 11" from bottom to top.

The third substrate 4" may be a quartz substrate containing a material composition of pure silica or doped silica or other materials.

The third buried silica layer 5" may be arranged on the third substrate 4" (shown in FIG. 4), and contain a material composition of pure silica or doped silica. The third buried silica layer 5" may be a single silica-layer or a double silica-layer. Specifically, in a case that a refractive index of the third buried silica layer 5" is greater than that of the third substrate 4", a single silica-layer may be used. In a case that the refractive index of the third buried silica layer 5" is less than that of the third substrate 4", a double silica-layer may be used, and a lower silica-layer in the double silica-layer has a refractive index less than that of an upper silica-layer in the double silica-layer.

The silica waveguide 12 may be arranged on the third buried silica layer 5" according to a second preset shape (shown in FIG. 9), contain a material composition of pure silica or doped silica, and have a refractive index close to that of the second buried silica layer. A structure of the silica waveguide 12 may include, but is not limited to, a silica straight waveguide, a gradually narrowed silica waveguide, and a gradually widened silica waveguide.

The third top silica layer 11" may cover the silica waveguide 12, contain a material composition of pure silica or doped silica, and have a refractive index close to that of the third substrate 4". The third top silica layer 11" and the third substrate 4" may respectively serve as upper and lower cladding layers for the silica waveguide 12. The third top silica layer 11" and the third substrate 4" may have a refractive index less than that of the silica waveguide 12.

Further, a difference between the refractive index of the third buried silica layer 5" and the third cladding silica layer 8" and the refractive index of the third substrate 4" and the third top silica layer 11" is greater than the third preset value.

In the embodiments of the present disclosure, the refractive index of the first substrate 4, the second substrate 4' and the third substrate 4" is within a range of 1.444 to 1.532, the first preset value is preferably 0.1, the second preset value is preferably 0.2, and the third preset value is preferably 0.002. It may be understood that the refractive index of the first substrate 4, the second substrate 4' and the third substrate 4", the first preset value, the second preset value, and the third preset value are not limited to the above preferred values.

Further, the photonic chip in this embodiment may further include a second optical coupling array 13 and a third optical coupling array 14. The second optical coupling array 13 may include one or more second optical coupling structures, which are used to couple an optical signal to the lithium niobate thin film modulator connected thereto. The third optical coupling array 14 may include one or more third optical coupling structures, which are connected to the silica waveguide wavelength-division multiplexer 3 and used to couple and output an optical signal wavelength-division multiplexed by the silica waveguide wavelength-division multiplexer 3.

In the embodiments of the present disclosure, the optical signal is coupled into the chip via the second optical coupling structure, and beam splitting and beam combining operations are performed on the chip to obtain a desired number of optical paths. The coupled optical signal may be modulated by the lithium niobate modulator, and enter the first optical coupling structure after performing beam combining and beam splitting operations on the chip. After coupling of the first optical coupling structure, beam combining and splitting operations are performed again so that the optical signal enters the silica waveguide wavelength-division multiplexer 3. The beam splitting and beam combining operations may be also performed on the optical signal output by the silica waveguide wavelength-division multiplexer on the chip, so as to obtain a desired number of optical paths. Therefore, the number of the first lithium niobate modulator may be the same as or different from the number of the first optical coupling structure and the number of the second optical coupling structure, the number of input terminals of the silica waveguide wavelength-division multiplexer 3 may be the same as or different from the number of the first optical coupling structures, and the number of output terminals of the silica waveguide wavelength-division multiplexer 3 may be the same as or different from the number of the first optical coupling structures.

A four-channel lithium niobate thin film modulator array and a 4×4 silica waveguide arrayed waveguide grating (AWG) wavelength-division multiplexer structure are shown in FIG. 1 by way of example of the structure of the photonic chip. It may be understood that the photonic chip structure may include and is not limited to four-channel input and four-channel output, and the number of input channels may not be equal to the number of output channels. In addition, the silica wavelength-division multiplexer structure may include but is not limited to AWG wavelength-division multiplexer structure and may also be other optical communication wavelength-division multiplexing devices with similar functions, such as a dielectric film or a grating-type wavelength-division multiplexing device. In the embodiments of the present disclosure, an operating wavelength of the wavelength-division multiplexing device may include but is not limited to light waves in typical optical communication bands of 1310 nm and 1550 nm.

It may be understood that in this embodiment, the first substrate 4, the second substrate 4' and the third substrate 4" are a whole prepared in the same process. The first buried silica layer 5, the second buried silica layer 5' and the third buried silica layer 5" are a whole prepared in the same process. The first cladding silica layer 8, the second cladding silica layer 8' and the third cladding silica layer 8" are a whole prepared in the same process. The first top silica layer 11, the second top silica layer 11' and the third top silica layer 11" are a whole prepared in the same process. The above-mentioned wholes are divided into three different functional regions to respectively form the lithium niobate thin film modulator, the first optical coupling structure, and the silica waveguide wavelength-division multiplexer.

Figure 13:
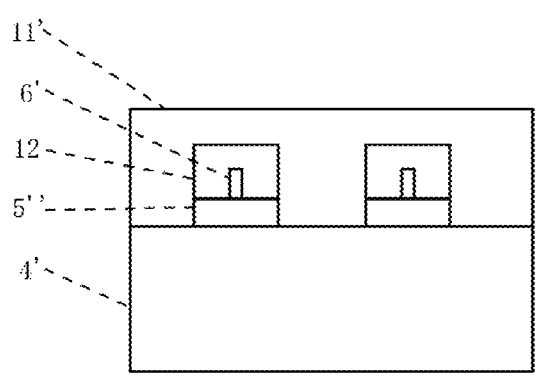
FIG. 13 schematically show a front view of a cross-section of a first optical coupling structure region after operation S7 is performed provided by the embodiments of the present disclosure.
Figure 14:
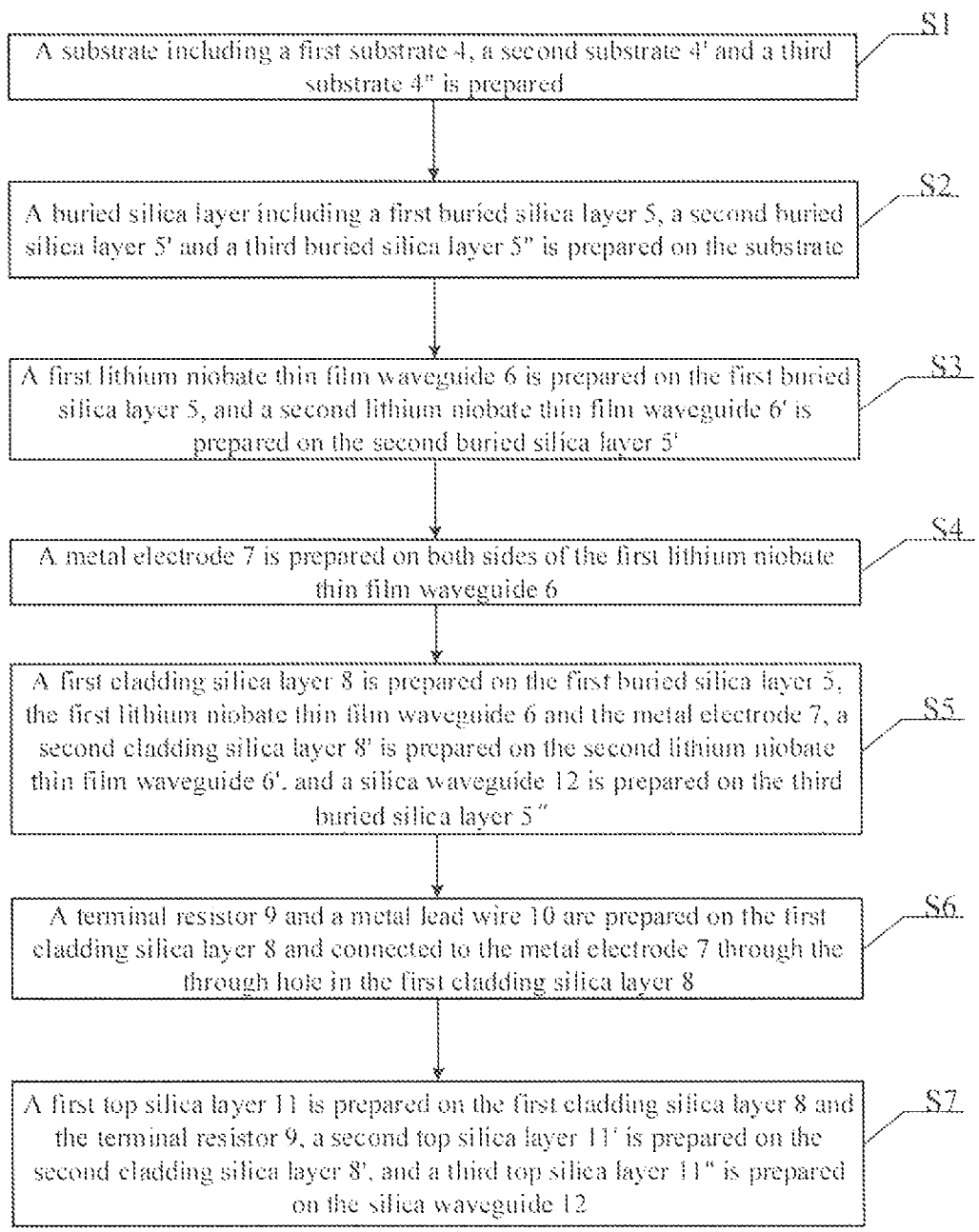
FIG. 14 schematically shows a flowchart of a method of preparing a photonic chip provided by the embodiments of the present disclosure.

An embodiment of the present disclosure provides a method of preparing a photonic chip. Referring to FIG. 14, a preparation method shown in FIG. 14 will be described in detail in conjunction with FIG. 2 to FIG. 13. The preparation method may include the following operations.

In S1, a substrate including a first substrate 4, a second substrate 4' and a third substrate 4" is prepared.

In operation S1, a quartz substrate layer is prepared to support an entire wafer. The quartz substrate layer may be divided into three regions including the first substrate 4, the second substrate 4' and the third substrate 4", which are used to support the lithium niobate thin film modulator, the first optical coupling structure and the silica waveguide wavelength-division multiplexer 3, respectively.

In S2, a buried silica layer including a first buried silica layer 5, a second buried silica layer 5' and a third buried silica layer 5" is prepared on the substrate.

In operation S2, the buried silica layer is prepared on the substrate. The buried silica layer may be divided into three regions including the first buried silica layer 5, the second buried silica layer 5' and the third buried silica layer 5", and the third buried silica layer 5" is used to form a lower part of a core layer of the silica waveguide 12.

A refractive index of the quartz substrate layer for light with a wavelength of 1550 nm is within a range of about 1.4 to 1.6, and a refractive index of the buried silica layer for light with a wavelength of 1550 nm is within a range of about 1.4 to 1.6. In the embodiments of the present disclosure, the refractive index of the prepared buried silica layer is greater than that of the quartz substrate layer, and a structure formed by the quartz substrate and the buried silica layer is shown in FIG. 2A.

In addition, a material other than quartz may also be used to prepare the substrate. If the material has a refractive index less than that of the buried silica layer, the single silica-layer structure shown in FIG. 2A may be used; if the material has a refractive index greater than that of the buried silica layer, the double silica-layer structure shown in FIG. 2B may be used, in which a refractive index of a lower buried oxide layer is less than that of an upper buried oxide layer. The lower buried oxide layer may serve as a buffer layer between the upper buried oxide layer and the high-refractive-index substrate, so that a refractive index of a silica layer close to the first lithium niobate thin film waveguide 6 and the second lithium niobate thin film waveguide 6' is greater than that of a silica layer away from the first lithium niobate thin film waveguide 6 and the second lithium niobate thin film waveguide 6'.

In S3, a first lithium niobate thin film waveguide 6 is prepared on the first buried silica layer 5, and a second lithium niobate thin film waveguide 6' is prepared on the second buried silica layer 5'.

Figure 2A:
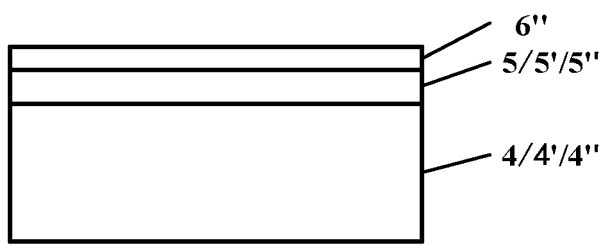
FIG. 2A schematically shows a front view of a base material after a lithium niobate thin film layer is prepared in operation S3 provided by the embodiments of the present disclosure.
Figure 2B:
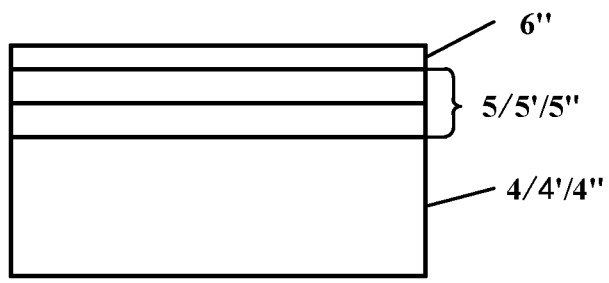
FIG. 2B schematically shows a front view of another base material after a lithium niobate thin film layer is prepared in operation S3 provided by the embodiments of the present disclosure.
Figure 3A:
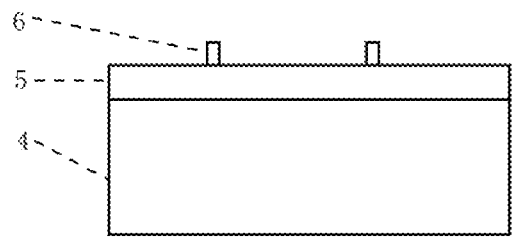
FIG. 3A and FIG. 3B schematically show a front view and a top view of a device cross-section after a first lithium niobate thin film waveguide is prepared in operation S3 provided by the embodiments of the present disclosure, respectively.
Figure 3B:
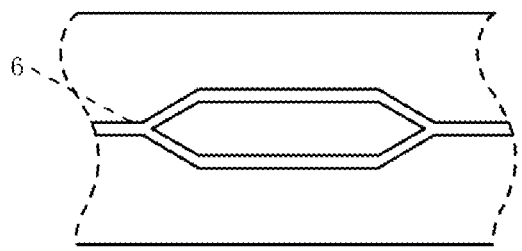
Figure 3C:
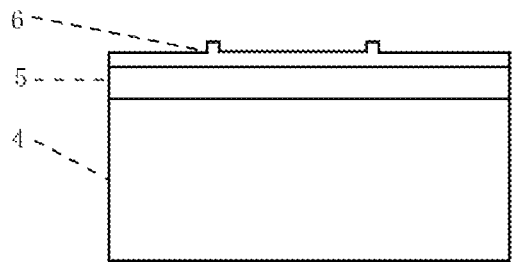
FIG. 3C and FIG. 3D schematically show a front view and a top view of another device cross-section after the first lithium niobate thin film waveguide is prepared in operation S3 provided by the embodiments of the present disclosure, respectively.
Figure 3D:
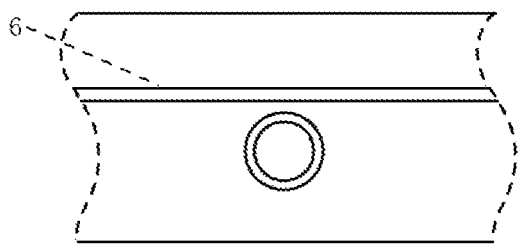

In operation S3, a lithium niobate thin film layer 6" is firstly bonded on the buried silica layer (including the first buried silica layer 5, the second buried silica layer 5', and the third buried silica layer 5") through a special process, as shown in FIG. 2A and FIG. 2B.

In the embodiments of the present disclosure, the quartz substrate layer, the buried silica layer and the lithium niobate thin film layer constitute an initial base, in which the quartz substrate layer is a lowermost layer of the initial base material, the buried silica layer is an intermediate layer of the initial base material, and the lithium niobate thin film layer is an uppermost layer of the initial base material.

Then, the lithium niobate thin film layer 6" on the first buried silica layer 5 may be photoetched into an optical waveguide structure in a first preset shape, so as to form the first lithium niobate thin film waveguide 6. The first preset shape may include, but is not limited to a Mach-Zehnder interference type structure and a micro-ring coupler type structure. A cross-sectional dimension of the first lithium niobate thin film waveguide 6 is on the order of square microns. The Mach-Zehnder interference type structure is a strip structure shown in FIG. 3A and FIG. 3B, and a waveguide of this shape is a cuboid waveguide. The micro-ring coupler type structure is a ridge structure shown in FIG. 3C and FIG. 3D, and a waveguide of this shape is a cuboid waveguide on a substrate.

The lithium niobate thin film layer 6" on the second buried silica layer 5' may be photoetched into a tapered optical waveguide structure to form the second lithium niobate thin film waveguide 6'. The tapered structure may have an end with a larger cross-sectional area connected to the first lithium niobate thin film waveguide 6 and an end with a smaller area located in a direction away from the first lithium niobate thin film waveguide 6, and the tapered structure is preferably a quadrangular pyramid. In addition, the shape of the second lithium niobate thin film waveguide 6' may include both a cuboid and a quadrangular pyramid, an end with a larger cross-sectional area of the quadrangular pyramid waveguide may be connected to the cuboid waveguide, the cuboid waveguide may be connected to the first lithium niobate thin film waveguide 6, and a side with a reduced cross-section area of the quadrangular pyramid waveguide extends in a direction away from the first lithium niobate thin film waveguide 6.

Figure 4:
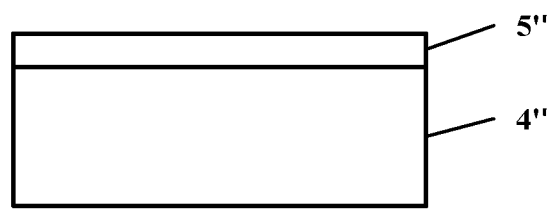
FIG. 4 schematically shows a front view of a cross-section of a silica waveguide wavelength-division multiplexer region after operation S3 is performed provided by the embodiments of the present disclosure.

The lithium niobate thin film layer 6" on the third buried silica layer 5" may be completely etched and removed, as shown in FIG. 4, so as to prepare the silica waveguide 12 on the third buried silica layer 5".

In operation S3, a method of etching the lithium niobate thin film layer 6" may be, for example, a dry etching, preferably a plasma-enhanced reactive ion etching. An etching gas may be fluorine-based or chlorine-based gas, which may include but is not limited to $CF_4$, $CHF_3$, $SF_6$, $Cl_2$, $BCl_3$, Ar, $O_2$, etc. It may be understood that the method of etching the lithium niobate thin film layer 6" is not limited to the above-mentioned dry etching.

In the embodiments of the present disclosure, in order to ensure a single-mode transmission, a width and a height of the cuboid waveguide are preferably within a range of 0.5 μm to 2 μm, and a vertical distance between an end face of the quadrangular pyramid waveguide close to the silica waveguide and an end face of the quadrangular pyramid waveguide away from the silica waveguide is preferably 200 μm, so that a light field may slowly transition from the first lithium niobate thin film waveguide 6 to the silica waveguide 12. It may be understood that a value range of the width and the height of the cuboid waveguide is not limited to 0.5 μm to 2 μm, and a selection of the vertical distance between the two end faces is not limited to 200 μm.

In S4, a metal electrode 7 is prepared on both sides of the first lithium niobate thin film waveguide 6.

Figure 5A:
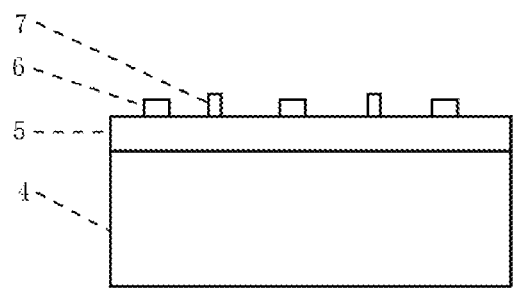
FIG. 5A and FIG. 5B schematically show a front view and a top view of a device cross-section after a metal electrode is prepared in operation S4 provided by the embodiments of the present disclosure, respectively.
Figure 5B:
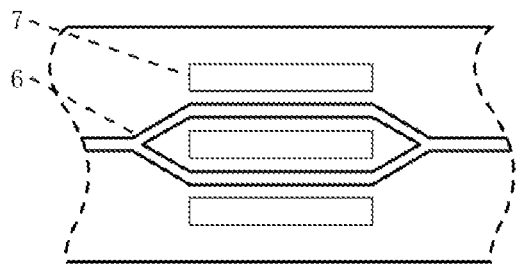

The metal electrode 7 is used to form an electrical modulation structure together with the first lithium niobate thin film waveguide 6, and only exists in the lithium niobate thin film modulator of the embodiment of the present disclosure. The metal electrode 7 may contain gold, copper, aluminum or other conductive materials. The metal electrode 7 may be formed by depositing a conductive material on both sides of the first lithium niobate thin film waveguide 6 by a physical vapor deposition method, as shown in FIG. 5A and FIG. 5B.

In S5, a first cladding silica layer 8 is prepared on the first buried silica layer 5, the first lithium niobate thin film waveguide 6 and the metal electrode 7, a second cladding silica layer 8' is prepared on the second lithium niobate thin film waveguide 6', and a silica waveguide 12 is prepared on the third buried silica layer 5".

Figure 6:
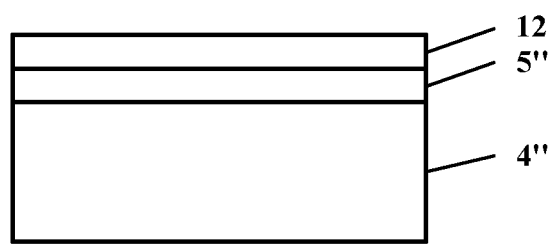
FIG. 6 schematically shows a front view of a cross-section of a silica waveguide wavelength-division multiplexer region after depositing in operation S5 provided by the embodiments of the present disclosure.
Figure 7A:
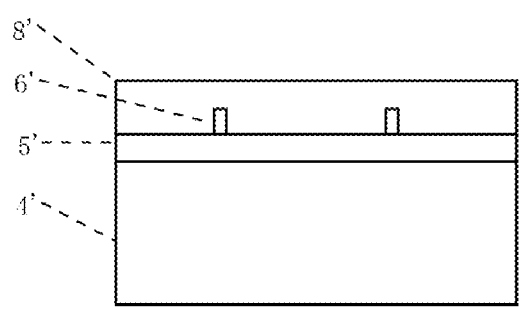
FIG. 7A and FIG. 7B schematically show a front view and a top view of a cross-section of a first optical coupling structure region after depositing in operation S5 provided by the embodiments of the present disclosure, respectively.
Figure 7B:
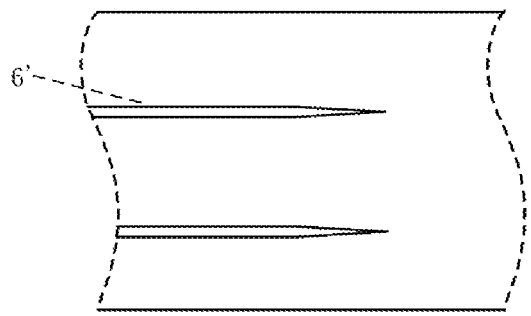

In operation S5, a cladding silica layer is firstly deposited on an exposed surface of the prepared device, including on a surface of the first buried silica layer 5, a surface of the first lithium niobate thin film waveguide 6, a surface of the metal electrode 7, a surface of the second buried silica layer 5', a surface of the second lithium niobate thin film waveguide 6' and a surface of the third buried silica layer 5". A refractive index of the cladding silica layer may be close to or equal to that of the buried silica layer (for example, a difference between the refractive indexes of the two may be within 10%), and greater than that of the quartz substrate layer. A cladding silica layer with high refractive index may be prepared by doping a deposition process gas or adjusting a deposition process gas ratio during a deposition process. The wavelength-division multiplexer region formed after the deposition of the cladding silica layer is shown in FIG. 6, and the first light coupling structure formed after the deposition of the cladding silica layer is shown in FIG. 7A and FIG. 7B.

In this embodiment, for example, a plasma-enhanced chemical vapor deposition process may be used to form the cladding silica layer. Silica may be generated by a reaction of silane and nitric oxide at 350° C., and a reaction equation is $SiH_4$ (gaseous)+$2N_2O$ (gaseous)–$SiO_2$ (solid)+$2N_2$ (gaseous)+$2H_2$ (gaseous). The cladding silica layer meeting the above-mentioned refractive index requirement may be obtained by adjusting a ratio of $SiH_4$ to $2N_2O$, or may be obtained by doping. After the cladding silica layer is formed by deposition, a planarization processing needs to be performed on the deposited silica, for example, using a chemical mechanical polishing.

Then, the planarized cladding silica layer on the surface of the first buried silica layer 5, the surface of the first lithium niobate thin film waveguide 6 and the surface of the metal electrode 7 may be etched to form a through hole, so that the first cladding silica layer 8 is obtained, as shown in FIG. 8A and FIG. 8B.

Figure 9:
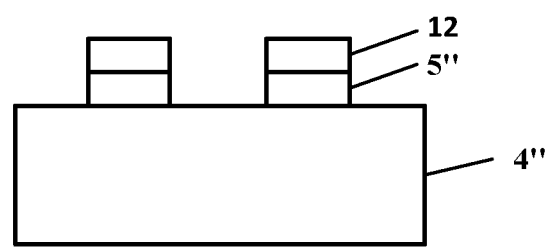
FIG. 9 schematically shows a front view of a cross-section of a silica waveguide wavelength-division multiplexer region after etching in operation S5 provided by the embodiments of the present disclosure.

The second buried silica layer 5' and the planarized cladding silica layer on a surface thereof may be etched and an etching depth reaches the second substrate 4'. The cladding silica layer formed after the etching is the second cladding silica layer 8', which completely covers the second lithium niobate thin film waveguide 6' and extends in a direction away from the modulator region, as shown in FIG. 9.

Figure 10A:
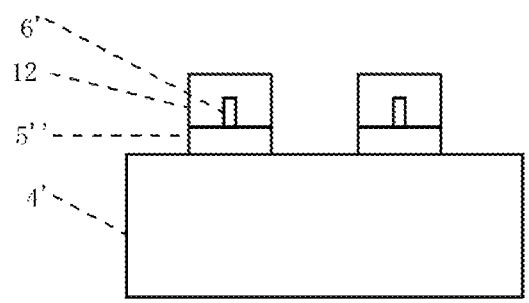
FIG. 10A and FIG. 10B schematically show a front view and a top view of a cross-section of a first optical coupling structure region after etching in operation S5 provided by the embodiments of the present disclosure, respectively.
Figure 10B:
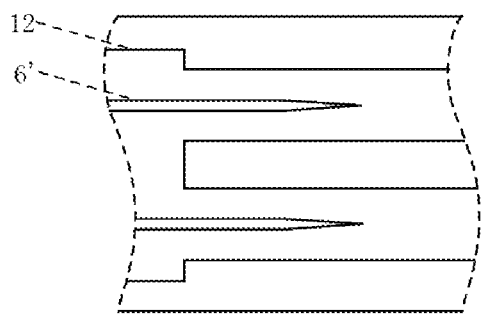

The third buried silica layer 5" and the planarized cladding silica layer on a surface thereof may be etched and an etching depth reaches the third substrate 4". The cladding silica layer formed after the etching is the silica waveguide 12. Further, the silica waveguide 12 may be prepared as an arrayed waveguide grating device or the like to serve as a silica waveguide wavelength-division multiplexer. An end face of the silica waveguide 12 is a rectangle or a square, with a cross-sectional area on the order of hundreds of square microns, as shown in FIG. 10A and FIG. 10B.

In this embodiment, a process of etching the cladding silica layer specifically includes: applying a photoresist on the cladding silica layer, exposing and developing using a mask, transferring a mask pattern to the photoresist, and then transferring the photoresist pattern to the cladding silica layer by etching. Specifically, a gas mixture of $CF_4$ and $H_2$ may be selected as an etching gas for silica, and a content of $H_2$ in the gas mixture may be 50% of a volume of the gas mixture, a selection ratio of the $CF_4/H_2$ gas mixture of this composition to silica and silicon may exceed 40:1, and the etching selectivity is good. In a plasma environment, $CF_4$ may generate fluorine atoms, which may react with silica so as to etch silica. The reaction equation is:

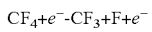

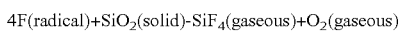

In the above reaction process, $H_2$ functions to reduce a reaction rate of $CF_4$ and silicon and increase the etching selection ratio of $CF_4$ to silica and silicon. The etching process may continue until reaching above the quartz substrate layer.

In S6, a terminal resistor 9 and a metal lead wire 10 are prepared on the first cladding silica layer 8 and connected to the metal electrode 7 through the through hole in the first cladding silica layer 8.

In operation S6, a metal may be deposited in the through hole of the first cladding silica layer 8 and a part of a surface of the first cladding silica layer 8 to prepare the terminal resistor 9 and the metal lead wire 10, as shown in FIG. 11A and FIG. 11B.

Specifically, the metal lead wire 10 may be prepared by using a physical vapor deposition method, and the metal lead wire 10 may contain aluminum or other conductive materials.

A metal and titanium nitride may be deposited on a part of the surface of the upper layer of the first cladding silica layer 8, then the deposited metal and titanium nitride may be photoetched or peeled off into the terminal resistor 9 using a pattern transfer method (such as photoetching or peeling off), and a metal may be deposited in the through hole to electrically connect the terminal resistor 9 in the upper layer and the metal electrode 7 in the lower layer. The terminal resistor 9 is a terminal load resistor of a lithium niobate thin film modulator transmission line, and an electrode and resistor structure may be optimized to achieve the impedance matching of the two so as to improve a modulation efficiency of the lithium niobate thin film modulator. It may be understood that a material of the terminal resistor 9 may include but not be limited to titanium nitride.

In S7, a first top silica layer 11 is prepared on the first cladding silica layer 8 and the terminal resistor 9, a second top silica layer 11' is prepared on the second cladding silica layer 8', and a third top silica layer 11" is prepared on the silica waveguide 12.

The top silica layer is prepared on the exposed surface of the prepared device. The top silica layer includes the first top silica layer 11, the second top silica layer 11' and the third top silica layer 11" described above, and the refractive index of the top silica layer is less than that of the buried silica layer and the cladding silica layer. Preferably, the top silica layer may be prepared by a deposition process, and the top silica layer with low refractive index may be prepared by doping a deposition process gas or adjusting a deposition process gas ratio during the deposition process.

Further, the first top silica layer 11 needs to be etched to form a metal pad. The second top silica layer 11' and the third top silica layer 11" do not need to be etched. The lithium niobate thin film modulator formed after operation S7 is shown in FIG. 12A and FIG. 12B, and the first optical coupling structure formed after operation S7 is shown in FIG. 13.

In the embodiments of the present disclosure, an alignment of a single-mode optical fiber and the silica waveguide may be achieved by etching a V-shaped groove on the base material. The optical fiber may be placed in the V-shaped groove, and after an alignment, the single-mode optical fiber and the silica waveguide may be fixed with a cover plate and an adhesive.

The photonic chip and the preparation method thereof provided in the present disclosure may achieve a monolithic integration of an optical modulation function and a wavelength-division multiplexing function in an optical communication process, so that a insertion loss introduced by a system formed by discrete devices may be reduced, and a small device size, a high integration, a high process precision, a good repeatability and a high yield rate may be achieved. In addition, a use of the lithium niobate thin film modulator may achieve high device modulation efficiency, a large bandwidth, and a high modulation rate.

The above-described specific embodiments have described in detail the objectives, technical solutions and advantages of the present disclosure. It should be understood that the above are only specific embodiments of the present disclosure and are not intended to limit the present disclosure. Any modifications, equivalent substitutions, improvements, etc., made within the spirit and scope of the present disclosure shall be included within the scope of protection of the present disclosure.

What is claimed is:

1. A photonic chip comprising a lithium niobate thin film modulator array, a first optical coupling array and a silica waveguide wavelength-division multiplexer, wherein,
    the lithium niobate thin film modulator array comprises one or more lithium niobate thin film modulators and is configured to modulate an optical signal;

the first optical coupling array comprises one or more first optical coupling structures, and the first optical coupling structure has one end connected to a corresponding lithium niobate thin film modulator and the other end connected to the silica waveguide wavelength-division multiplexer so as to transmit the modulated optical signal to the silica waveguide wavelength-division multiplexer; and the silica waveguide wavelength-division multiplexer is configured to perform wavelength-division multiplexing on the modulated optical signal, wherein the lithium niobate thin film modulator comprises:
a first substrate;
a first buried silica laver arranged on the first substrate;
a first lithium niobate thin film waveguide arranged on the first buried silica laver according to a first preset shape;
a metal electrode arranged on both sides of the first lithium niobate thin film waveguide layer;
a first cladding silica layer covering the first buried silica layer, the first lithium niobate thin film waveguide and the metal electrode, wherein the first cladding silica layer is provided with a through hole to expose the metal electrode;
a terminal resistor connected to the metal electrode through the through hole;
a metal lead wire connected to the metal electrode through the through hole; and
a first top silica layer covering the first cladding silica layer and the terminal resistor.

2. The photonic chip according to claim 1, wherein the first optical coupling structure comprises:
a second substrate;
a second buried silica layer arranged on the second substrate;
a second lithium niobate thin film waveguide arranged on the second buried silica layer, wherein the second lithium niobate thin film waveguide is shaped as a tapered structure having an end with a larger cross-sectional area connected to the first lithium niobate thin film waveguide and an end with a smaller cross-sectional area connected to the silica waveguide wavelength-division multiplexer;
a second cladding silica layer covering the second buried silica layer and the second lithium niobate thin film waveguide; and
a second top silica layer covering the second cladding silica layer.

3. The photonic chip according to claim 2, wherein the silica waveguide wavelength-division multiplexer comprises:
a third substrate;
a third buried silica layer arranged on the third substrate;
a silica waveguide arranged on the third buried silica layer according to a second preset shape, and connected to the end with the smaller cross-sectional area of the second lithium niobate thin film waveguide; and
a third top silica layer covering the silica waveguide.

4. The photonic chip according to claim 3, wherein the first buried silica layer, the second buried silica layer or the third buried silica layer is a single silica-layer with a refractive index greater than that of the first substrate, the second substrate or the third substrate; or
the first buried silica layer, the second buried silica layer or the third buried silica layer is a double silica-layer with a refractive index less than that of the first substrate, the second substrate or the third substrate, and a lower silica-layer in the double silica-layer has a refractive index less than that of an upper silica-laver in the double silica-layer.

5. The photonic chip according to claim 3, wherein a difference between a refractive index of the first cladding silica layer, the second cladding silica layer or the silica waveguide and a refractive index of the first buried silica layer, the second buried silica layer or the third buried silica layer is less than a first preset value.

6. The photonic chip according to claim 3, wherein a difference between a refractive index of the first top silica layer, the second top silica layer and the third top silica layer and a refractive index of the first substrate, the second substrate and the third substrate is less than a second preset value.

7. The photonic chip according to claim 3, wherein a difference between a refractive index of the first buried silica layer, the second buried silica layer or the third buried silica layer and a refractive index of the first substrate, the second substrate and the third substrate is greater than a third preset value, and a difference between a refractive index of the first cladding silica layer, the second cladding silica layer or the silica waveguide and a refractive index of the first top silica layer, the second top silica layer and the third top silica layer is greater than the third preset value.

8. A method of preparing a photonic chip, comprising:
S1 of preparing a substrate comprising a first substrate, a second substrate and a third substrate;
S2 of preparing a buried silica layer on the substrate, wherein the buried silica layer comprises a first buried silica layer, a second buried silica layer and a third buried silica layer;
S3 of preparing a first lithium niobate thin film waveguide on the first buried silica layer, and preparing a tapered second lithium niobate thin film waveguide on the second buried silica layer;
S4 of preparing a metal electrode on both sides of the first lithium niobate thin film waveguide;
S5 of preparing a first cladding silica layer on the first buried silica layer, the first lithium niobate thin film waveguide and the metal electrode, preparing a second cladding silica layer on the second lithium niobate thin film waveguide, and preparing a silica waveguide on the third buried silica layer;
S6 of preparing a terminal resistor and a metal lead wire on the first cladding silica layer, and connecting the terminal resistor and the metal lead wire to the metal electrode through a through hole in the first cladding silica layer;
S7 of preparing a first top silica layer on the first cladding silica layer and the terminal resistor, preparing a second top silica layer on the second cladding silica layer, and preparing a third top silica layer on the silica waveguide.

9. The method of preparing the photonic chip according to claim 8, wherein the second lithium niobate thin film waveguide has an end with a larger cross-sectional area connected to the first lithium niobate thin film waveguide and an end with a smaller cross-sectional area connected to the silica waveguide.

* * * * *